D. B. ROGERS.
Manufacture of Cultivator Teeth.
No. 4,265.   Patented Nov. 8, 1845.
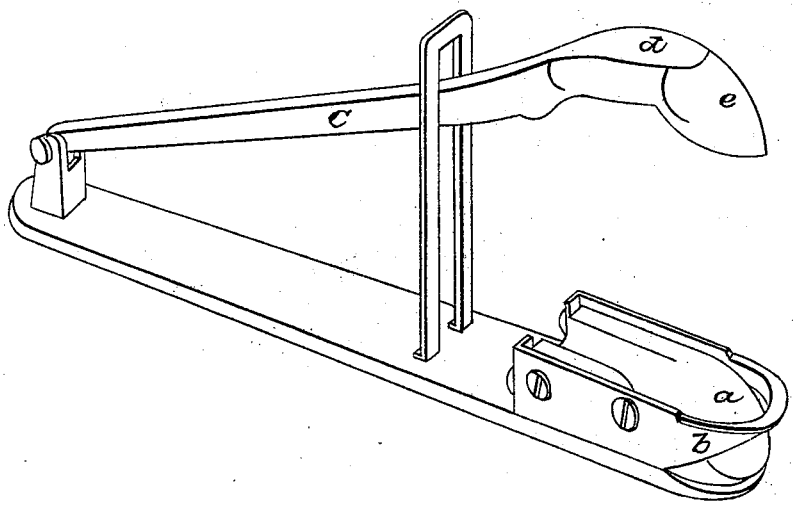
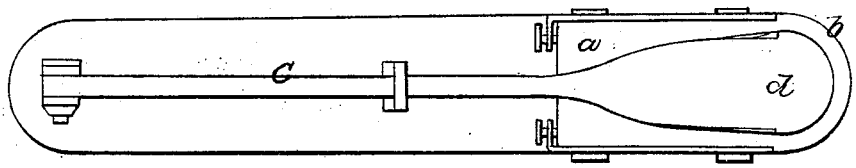

UNITED STATES PATENT OFFICE.

DAVID B. ROGERS, OF STAFFORD, NEW YORK.

IMPROVEMENT IN DIES FOR CUTTING AND FORMING CULTIVATOR-TEETH.

Specification forming part of Letters Patent No. 4,265, dated November 8, 1845.

*To all whom it may concern:*

Be it known that I, DAVID B. ROGERS, of Stafford, in the county of Genesee and State of New York, have invented a new and useful Improvement in Machinery for Cutting and Forming the Teeth of Cultivators and other Similar Purposes; and I do hereby declare that the following is a full, clear, and exact description thereof, reference being had to the accompanying drawings, which form a part of said specification, in which—

Figure 1 is an isometrical view. Fig. 2 is a top view of the same.

The nature of my invention consists in constructing a machine with a shear for cutting into shape the tooth from thin plate steel and swaging said teeth into form at one operation, which in the manufacture requires only one heat for the whole operation.

To construct my machine, a concave die, $a$, is formed to shape the outside of the tooth in. This die has affixed to it a steel piece, $b$, of horseshoe form, which forms one of the shear-blades for cutting the shape of the toe of the tooth. This shear can be attached to the die by set-screws, so as to set it up to the other blade, about to be described.

Jointed to the frame on which the die $a$ rests there is a lever, $c$, the end of which that comes directly over the die being formed into a counter die, $d$, the front end being rounded in the exact form of the tooth to be made. Around this curved part there is affixed a shear-blade, $e$, that cuts, in connection with blade $b$, the toe of the tooth as it descends, while at the same time the counter die is forming it into the proper shape.

The last described blade only extends out to the widest part of the counter die, which is far enough to cut off the plate of steel used in the manufacture. The front part of the upper blade at the center of the curve is longer than at any other point cutting, from the center toward each edge, so that the toe of the tooth as it is cut is gradually bent down into form and the iron plate is firmly held in a proper position to be acted on.

Having thus fully described my improvement, what I claim therein as new, and desire to secure by Letters Patent, is—

The combination of the cutter or shears projecting down in the center, so as to commence cutting on the middle of the plate, with the die for forming the teeth of cultivators, substantially in the manner and for the purposes set forth.

DAVID B. ROGERS.

Witnesses:
I. P. ROSS,
J. J. GREENOUGH.